United States Patent
Dahlman et al.

(10) Patent No.: US 8,594,012 B2
(45) Date of Patent: Nov. 26, 2013

(54) UPLINK POWER CONTROL METHOD AND USER EQUIPMENT SUPPORTING BOTH COMMON AND SEPARATE TPC COMMANDS

(75) Inventors: Erik Dahlman, Bromma (SE); Anders Furuskar, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 444 days.

(21) Appl. No.: 12/740,260

(22) PCT Filed: Apr. 16, 2008

(86) PCT No.: PCT/SE2008/050426
§ 371 (c)(1),
(2), (4) Date: Apr. 28, 2010

(87) PCT Pub. No.: WO2009/048404
PCT Pub. Date: Apr. 16, 2009

(65) Prior Publication Data
US 2010/0238892 A1    Sep. 23, 2010

Related U.S. Application Data

(60) Provisional application No. 60/978,497, filed on Oct. 9, 2007.

(51) Int. Cl.
*H04B 7/185* (2006.01)

(52) U.S. Cl.
USPC .......................................... 370/318; 370/335

(58) Field of Classification Search
USPC ......... 370/310, 311, 315, 316, 317, 318, 328, 370/329, 335, 336, 343, 345; 455/7, 11.1, 455/12.1, 13.4, 39, 500, 507, 517, 522
See application file for complete search history.

(56) References Cited

U.S. PATENT DOCUMENTS

| | | | |
|---|---|---|---|
| 5,732,353 | A | 3/1998 | Haartsen |
| 7,206,596 | B2 | 4/2007 | Nishio |
| 2002/0001291 | A1 | 1/2002 | Williars et al. |
| 2002/0136193 | A1 | 9/2002 | Chang et al. |

(Continued)

FOREIGN PATENT DOCUMENTS

| | | |
|---|---|---|
| CN | 1770655 A | 5/2006 |
| EP | 1 583 256 A1 | 10/2005 |
| JP | 2007-104037 A | 4/2007 |
| WO | WO 98/58461 A1 | 12/1998 |

OTHER PUBLICATIONS

Dahlman, Erik: "Draft LS on 1-19 information about RAN1 assumptions regarding TPC-PDCCH", 3GPP TSG-RAN WG1 #52bis, RI-081591, Published on Apr. 9, 2008, Shenzen, China.

(Continued)

*Primary Examiner* — Obaidul Huq

(57) ABSTRACT

A transmit power control (TPC) method and a user equipment (UE) of a telecommunications network utilizing the TPC method. The UE receives TPC commands intended for traffic and control channels. The TPC commands are separately identified by logical or physical resources associated with the channels. When the traffic and control channel TPCs occupy the same resources, the UE applies common power control commands to the traffic and control channels. When the traffic and control channel TPCs occupy different resources, the UE applies separate power control commands to the traffic and control channels.

11 Claims, 6 Drawing Sheets

(56) References Cited

U.S. PATENT DOCUMENTS

| | | | |
|---|---|---|---|
| 2003/0067899 A9* | 4/2003 | Chen et al. | 370/335 |
| 2004/0066772 A1* | 4/2004 | Moon et al. | 370/342 |
| 2004/0136330 A1* | 7/2004 | Woo | 370/252 |
| 2006/0171342 A1 | 8/2006 | Takashi | |
| 2008/0316950 A1* | 12/2008 | Damnjanovic | 370/311 |
| 2009/0046667 A1* | 2/2009 | Pelletier et al. | 370/335 |

OTHER PUBLICATIONS

Ericsson: 'Uplink Power 1-19 Control-Way forward', 3GPP TSG-RAN WGI #50bis, RI-074489, Published on Oct. 15, 2007, Shanghai, China.

3rd Generation Partnership Project; TSG RAN; Evolved Universal Terrestrial Radio Access (E-UTRA); Physical layer procedures (Release 8) [online], 3GPP TS 36.213 v8.0.0 (Sep. 2007) [retrieved on Dec. 10, 2008] Section 5.1 "Uplink power control".

Lee, Wet Al: "Performance of closed-loop power control for a multiple-channel mobile station in the cdma2000 system", Wireless Communications and Networking Conference, 1999. IEEE New Orleans, LA, USA Sep. 21-24, 1999.

Ericsson. Intra-cell Uplink Power Control for E-UTRA—Comments on Open Issues and Proposed Mechanism. TSG-RAN WG1 #48. R1-071036. St. Louis, USA. Feb. 12-16, 2007.

* cited by examiner

UPLINK POWER CONTROL METHOD AND USER EQUIPMENT SUPPORTING BOTH COMMON AND SEPARATE TPC COMMANDS

This application claims the benefit of U.S. Provisional Application No. 60/978,497, filed Oct. 9, 2007, the disclosure of which is fully incorporated herein by reference.

TECHNICAL FIELD

The present invention relates generally to the field of wireless communications, and, more particularly, to a transmission power control method and an apparatus in a telecommunications network system.

BACKGROUND

Setting output power levels of transmitters, radio base stations and mobile stations or terminals in uplink is commonly referred to as power control in mobile systems. The main objectives of power control include improved capacity, coverage, user quality (bit rate or voice quality) and reduced power consumption. Power control mechanisms can be categorized into several groups: (i) open-loop power control, (ii) closed loop power control and (iii) combined open- and closed loop power control. These differ in what input is used to determine the transmit power. In the open-loop power control case, the transmitter measures a signal to noise ratio or a signal to interference ratio of a signal sent from the receiver, and the transmitter sets its output power based on this measured signal. The closed-loop power control case (also known as inner-loop power control) is the ability of the transmitter to adjust its output power in accordance with one or more transmit power control (TPC) commands received from the receiver, in order to keep the received signal to interference ratio (SIR) at a given SIR target. In the closed-loop power control, the receiver thus measures the SIR of a signal from the transmitter and then sends a TPC command to the transmitter. The transmitter then adapts its output power based on the received TPC command. In the combined open- and closed-loop power control case, both inputs are used to set the transmit power.

Power control mechanisms discussed above are widely used in wireless systems. In e.g. systems with multiple channels between mobile terminals and radio base stations, different power control principles may be applied to the different channels. An advantage of using different power control principles to different channels yields more freedom in adapting the power control principle to the needs of individual channels. A drawback is an increase in complexity of maintaining several power control principles to the needs of individual channels. As an example, if common TPC commands for closed-loop and combined open-loop and closed-loop power principles are used, multiple channels can use the same TPC command. A drawback with such solution is that it yields limited flexibility in adjusting power to the radio conditions of the individual channels. If instead separate TPC commands are used, the overhead is increased.

SUMMARY

It is thus an object of the embodiments of the present invention to address the above mentioned problems and to provide a transmit power control method and an apparatus corresponding to a user equipment, that allow the support of both common and separate TPC commands to be applied to multiple channels e.g. traffic and control channels and thus providing flexibility in adjusting the transmit power to the conditions of the channels without increasing complexity.

According to a first aspect of embodiments of the present invention, the above stated problem is solved by means of a transmit power control method for use in a user equipment of a telecommunications system comprising at least one base station and at least one user equipment. The system further supports multiple channels including both traffic channels and control channels each occupying allocated physical or logical resources between the base station and the user equipment. In the method, transmit power control commands intended for the traffic and control channels respectively are received and these commands are separately identified by resources. When the transmit power control commands occupy the same identified resources, then common commands are applied for the traffic and control channels, and when the commands occupy different identified resources then separate transmit power control commands are applied for the traffic and control channels.

According to a second aspect of embodiments of the present invention, the above stated problem is solved by means of an apparatus corresponding to a user equipment of a telecommunications system. The system comprising at least one base station and at least one user equipment and further comprises multiple channels including traffic and control channels each occupying allocated logical or physical resources between the base station and the user equipment. The user equipment comprises means for receiving transmit power control commands for the traffic and control channels respectively. The commands being separately identified by resources. The user equipment further comprises means for applying for the traffic and control channels, common transmit power control commands when these commands occupy the same resources, and further comprises means for applying separate transmit power control commands for the traffic and control channels when these commands occupy different resources.

An advantage with the present invention is flexibility in selecting TPC commands to be applied to traffic and control channels depending on whether TPC commands are occupying same or separate dynamically (or statically) allocated resources.

Still other objects and features of the present invention will become apparent from the following detailed description in conjunction with the accompanying drawings, attention to be called to the fact, however, that the following drawings are illustrative only, and that various modifications and changes may be made in the specific embodiments illustrated as described within the scope of the appended claims. It should further be understood that the drawings are not necessarily drawn to scale and that, unless otherwise indicated, they are merely intended to conceptually illustrate the structures and procedures described herein.

DETAILED DESCRIPTION

Figure 1:
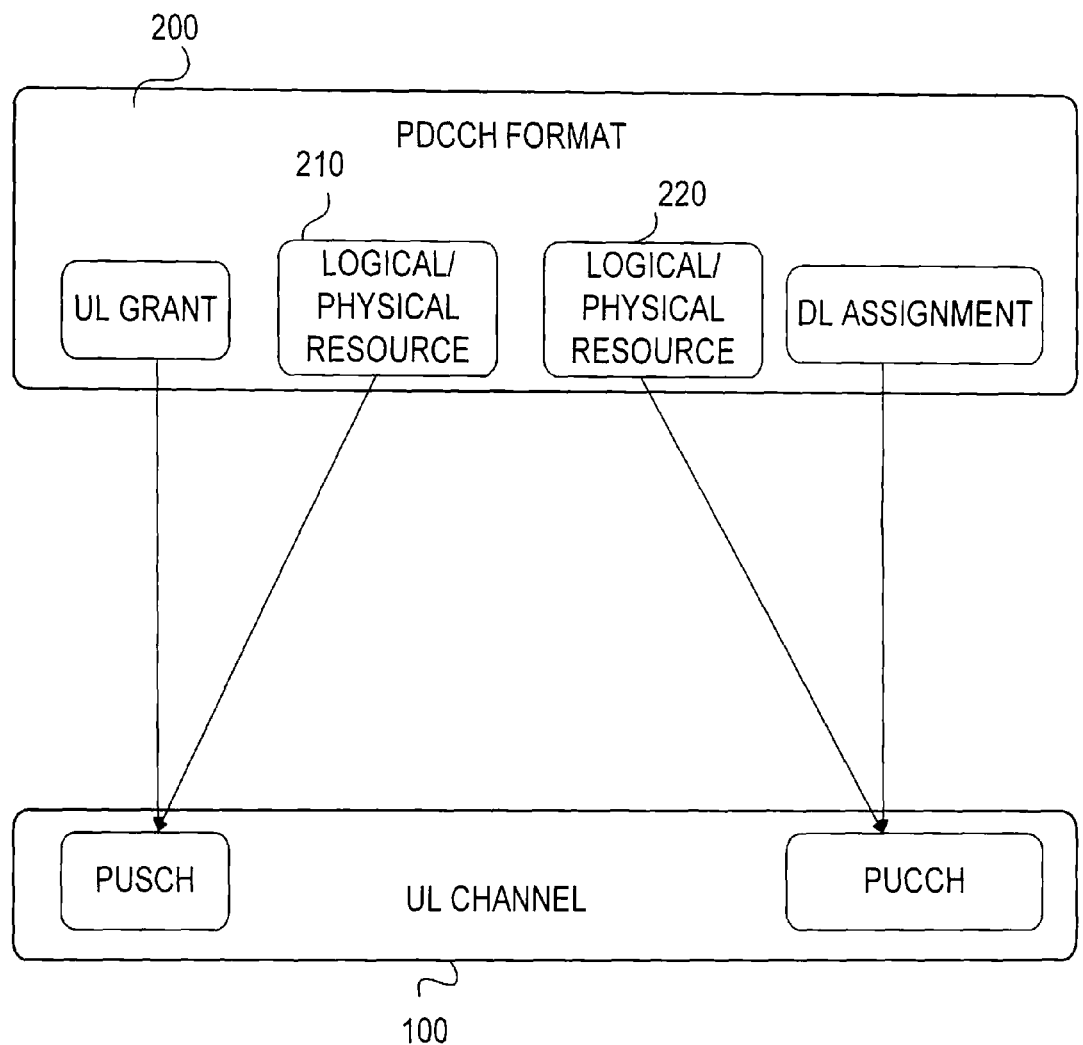
FIG. 1 is a diagram illustrating an exemplary embodiment of the present invention wherein separate resources are allocated.

In the following description, for purposes of explanation and not limitation, specific details are set forth such as particular architectures, scenarios, techniques, etc. in order to provide thorough understanding of the present invention. However, it will be apparent from the person skilled in the art that the present invention and its embodiments may be practiced in other embodiments that depart from these specific details.

The different embodiments of the present invention are described herein by way of reference to particular example scenarios. In particular the invention is described in a non-limiting general context in relation to a communications network based on the third generation (3G) long term evolution (LTE) concept. It should be noted that the present invention is not restricted to 3G LTE but can be applicable in other wireless systems such as WiMAX (worldwide interoperability for microwave access), or HSPA (high speed packet access) or WCDMA (wideband code division multiple access).

In 3G LTE, transmit power control (TPC) commands are usually transmitted on the physical downlink control channel (PDCCH) from a radio base station (RBS) to a mobile terminal. A base station in 3G LTE is also known as a NodeB or eNodeB and a mobile terminal is known as a UE (user equipment). The 3G LTE system is also a system where multiple channels exist between terminals and base stations. The channels comprise traffic (or data) channels and control channels. Control channels are used for transmission of control and configuration information necessary for operating an LTE-system and traffic channels are used for the user data. In a multichannel system, the traffic and control channels each occupy dynamically or statically allocated physical or logical resources both in the downlink and in the uplink. The allocation of physical or logical resources is also known as scheduling. Physical resources can include time, frequency or code resources and logical resources can include group identities, terminal identities, identifiers etc. Terminals or UEs may e.g. be assigned to groups using e.g. high layer signalling (such as radio resource control, RRC signalling). It should be noted that the operation of allocating resources for traffic and control channels is out of the scope of the present invention.

As mentioned above, the TPC commands are transmitted on the PDCCH from the base station or eNodeB to the terminal(s) or UEs. The TPC commands are intended to track variations in gain and interference of the channel they are applied to. In some systems, the control and traffic channels can occupy the same physical resources i.e. the same time and/or frequency resources. In such case, these channels are subject to the same variations. If instead the control and traffic channels occupy different resources, these channels can experience different variations in gain and interference. In such a case and according to embodiments of the present invention, separate TPC commands are used.

Referring to FIG. 1 there is illustrated an example of a structure of the uplink channel 100 and the format of the PDCCH 200 used to send TPC commands from a base station (NodeB or eNodeB) to a UE or to several UEs. As shown in FIG. 1, the uplink channel 100 comprises an uplink traffic channel represented here by a physical uplink shared channel (PUSCH) which occupies a dynamically or statically allocated resource. The uplink channel 100 also comprises an uplink control channel represented here by a physical uplink control channel (PUCCH) which also occupies a dynamically or statically allocated resource. The allocation (dynamic or static) of the PUSCH and the PUCCH for UEs may be performed by a eNodeB or a radio network controller (RNC) of the communications system. It should be noted that in the LTE architecture the eNodeB may have the functionality of the RNC. In FIG. 1, resources 210 and 220 represent resources that may be occupied by TPC commands sent on the PDCCH as described below.

According to an embodiment of the present invention. TPC commands included in uplink (UL) grants sent to individual terminals on the PDCCH are applied to the PUSCH, i.e. the uplink traffic channel, whereas TPC commands included in downlink (DL) assignments sent to individual terminals on the PDCCH are applied to the PUCCH i.e. the uplink control channel. A terminal or a UE thus is provided with means to receive the TPC commands and also means to apply the received TPC commands. A TPC command applied to the PUSCH is here denoted TPC-PUSCH and a TPC command applied to the PUCCH is denoted TPC-PUCCH. The TPC commands are transmitted in DL assignments and UL grants on the PDCCH and are here identified by RNTIs (radio network temporary identifiers). The RNTIs may be different thus allowing for independent power control of PUSCH and PUCCH. Therefore, if, in the RRC message(s) received by the UE from the eNodeB, different resources i.e. different RNTIs are used for the PUSCH respectively for the PUCCH then separate TPC commands are applied for the traffic and control channels. If on the other hand the RRC message(s) from the eNodeB to the UE indicates the same RNTIs for the PUSCH and the PUCCH then common TPC commands are applied for the traffic and control channels. Note that since the format of the UL grant and the DL assignment are different, the TPC commands for the PUCCH and PUSCH are separated. Therefore a RNTI received by the UE on the RRC message(s) to identify (e.g. by decoding) a TPC-PDCCH on which the UE should receive TPC commands for power controlling of PUSCH (in the case of UL grant) can be denoted TPC-PUSCH RNTI, and a RNTI received on the RRC message(s) used to identify (e.g. by decoding) a TPC-PDCCH on which the UE should receive TPC commands for power controlling of PUCCH (in DL assignment) can be denoted TPC-PUCCH RNTI. It should also be noted that the UE does not necessarily comprise a single means for applying the received TPC commands. In other words, the UE may comprise one means for applying common TPC commands for the traffic and control channels and one means for applying separate TPC commands for the traffic and control channels.

Figure 2A:
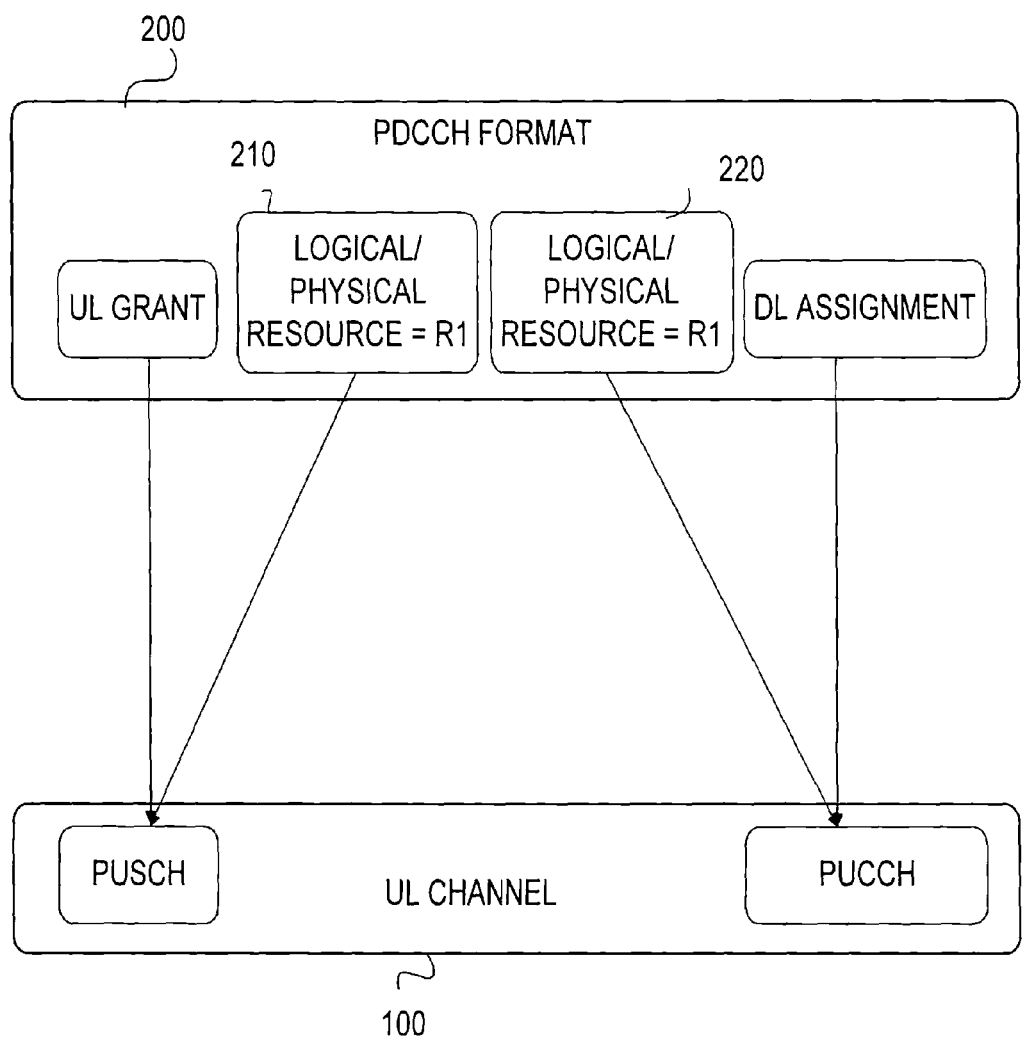
FIG. 2A is a diagram illustrating another exemplary embodiment of the present invention wherein common TPC commands are applied for traffic and control channels.

Note that in FIG. 1 only a single UL grant is shown, although several UL grants can be used. Referring to FIG. 2A there is illustrated the case where TPC commands for the traffic and control channels occupy the same resource. In this scenario, the RNTI for the TPC-PUSCH (i.e. TPC-PUSCH RNTI) and the RNTI for the TPC-PUCCH (i.e. TPC-PUCCH RNTI) are considered to be the same. This is indicated in FIG. 2A by using R1 for both resource 210 and resource 220.

Figure 2B:
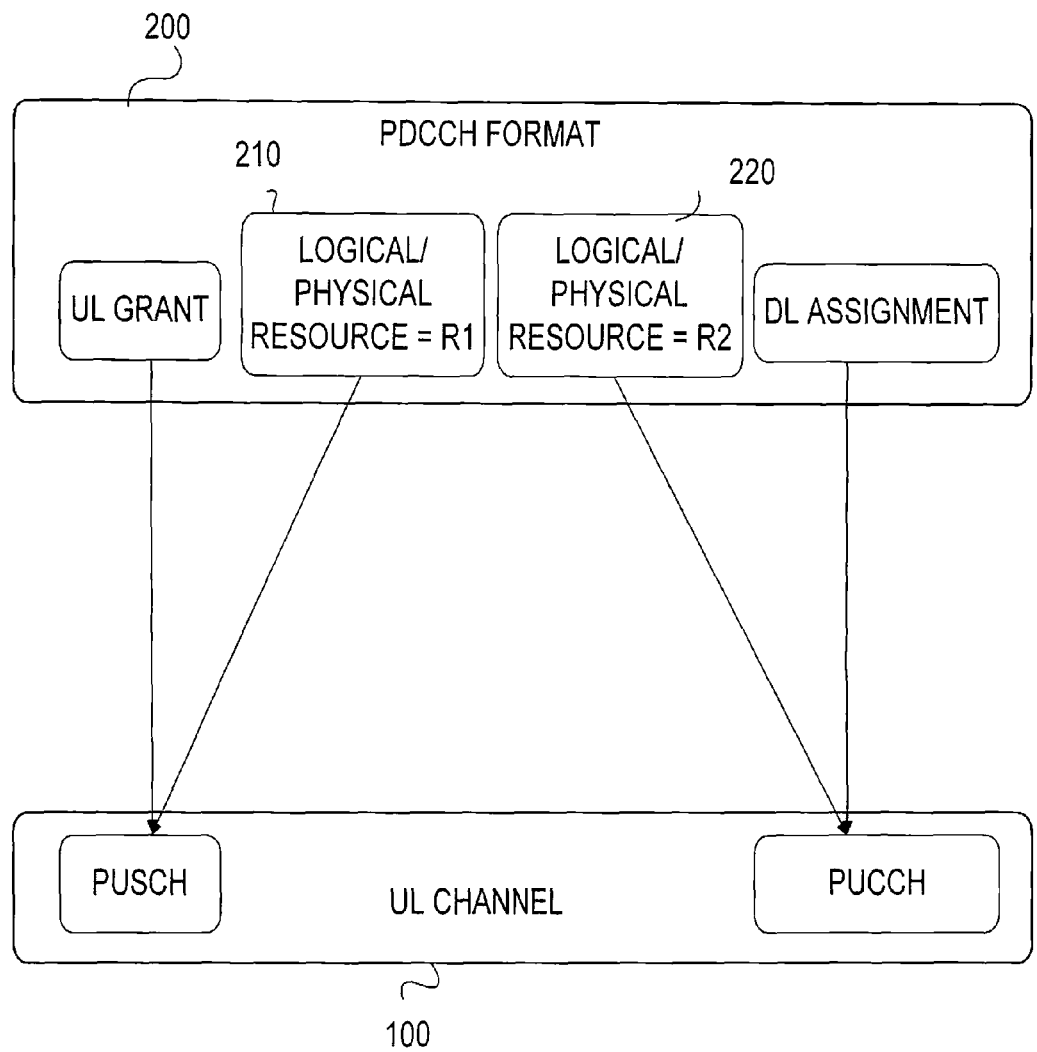
FIG. 2B is a diagram illustrating another exemplary embodiment of the present invention wherein separate TPC commands are applied for traffic and control channels.

According to another embodiment of the present invention, when the individual logical or physical resources 210, 220 do not coincide i.e. separate RNTIs are used, then separate TPC commands (i.e. TPC-PDCCH for PUSCH and TPC-PDCCH for PUCCH), that are sent on the PDCCH are applied to the PUSCH and to the PUCCH. This case scenario is shown in FIG. 2B where resources 210 and 220 are different. This is indicated in FIG. 2B where resource 210 is represented by R1 and resource 220 is represented by R2. R1 and R2 being different from each other.

According to an exemplary embodiment of the present invention, the TPC commands can also be sent to a group of terminals in a format of the PDCCH i.e. the TPC-PDCCH. The TPC-PDCCH can be addressed to a group identity representing a logical resource instead of a physical resource. As an example, mobile terminals or UEs can be assigned to groups using higher layer signalling. The RRC signalling is an example of a higher layer signalling. Using the TPC-PDCCH format allows sending TPC commands also preceding uplink transmission(s) not directly preceded by UL grants or DL assignments, e.g. so-called persistent traffic channel allocations, or periodically occurring control channels. In this exemplary embodiment the following steps may be used:
1. In the RRC signalling procedure, assigning terminals to group identities where separate identities (but not necessarily distinct) are used for PUSCH and PUCCH.
2. In case separate TPC commands for PUSCH and PUCCH are desired, distinct group identities are used for PUSCH and PUCCH.
3. If instead common TPC commands for PUSCH and PUCCH are desired, the same group identity is used for PUSCH and PUCCH.

Figure 3A:
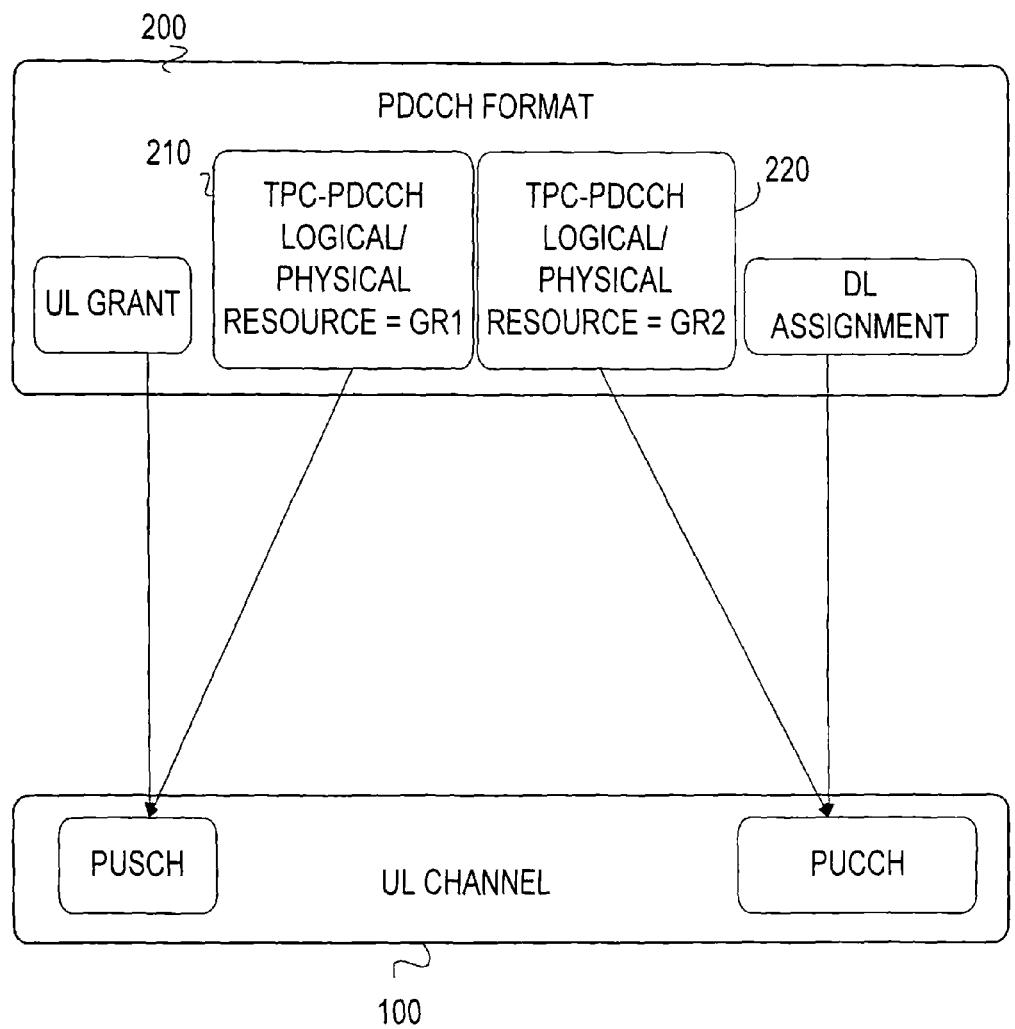
FIG. 3A is yet another diagram illustrating another exemplary embodiment of the present invention wherein separate TPC commands are applied for traffic and control channels.

As an example, when separate TPC commands are used, a terminal or a UE may be assigned group identity GR1 for PUSCH and GR2 for PUCCH, where GR1 is different from GR2. This is illustrated in FIG. 3A.

Figure 3B:
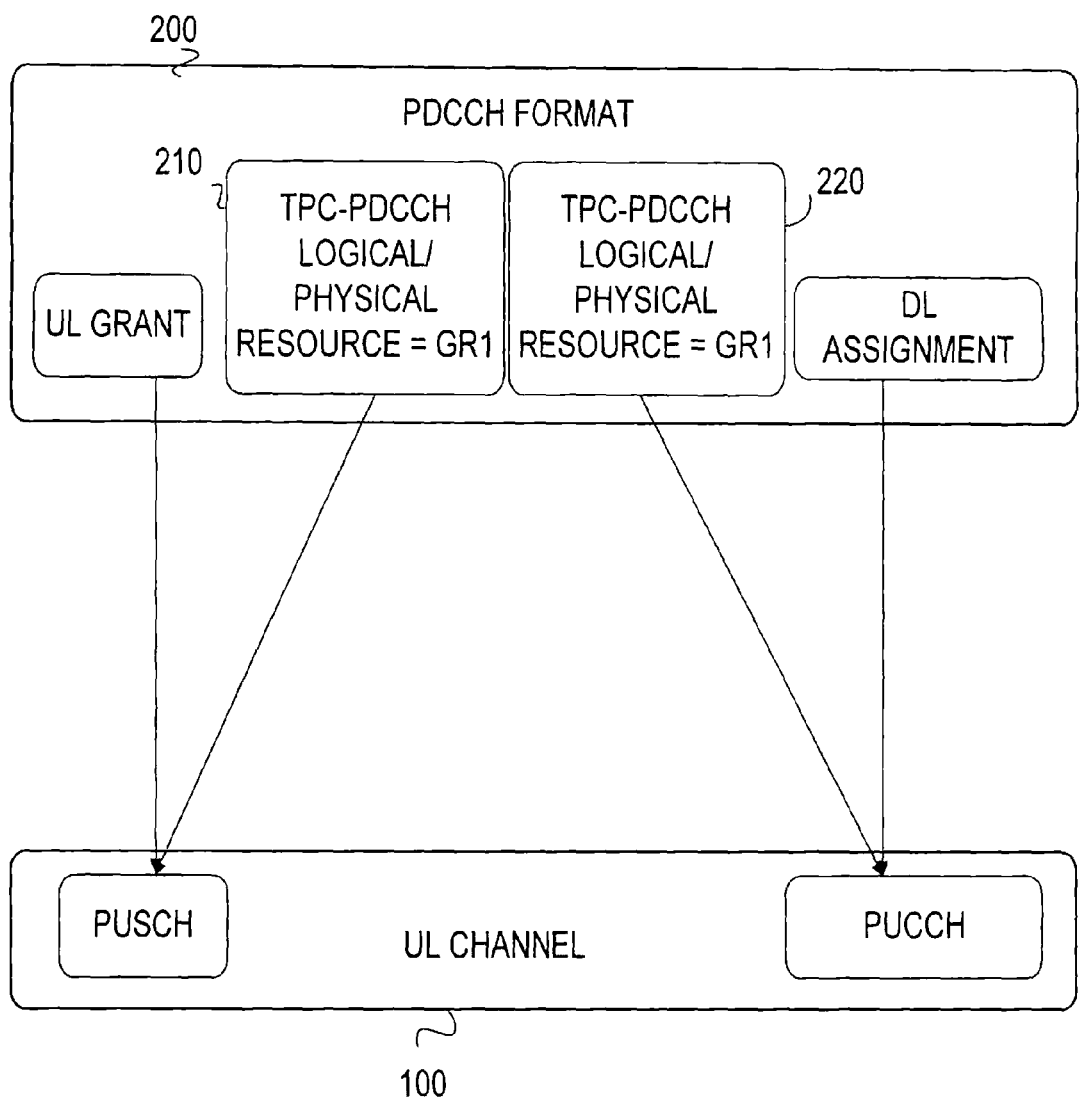
FIG. 3B is yet another diagram illustrating another exemplary embodiment of the present invention wherein common TPC commands are applied for traffic and control channels.

When common TPC commands are used, the terminal or UE may be assigned group identity GR1 for PUSCH and for PUCCH. This is illustrated in FIG. 3B.

Thus, according to the above described embodiment of the present invention, a terminal or a UE could be separately configured with TPC-PDCCH for PUCCH which can, as described earlier, be identified by a certain RNTI and a TPC-PDCCH for PUSCH (which also can be identified by a certain RNTI). It should be noted that the network can configure the same RNTI for the two cases, effectively leading to lower overhead. According to the present invention, the objective of power control may be different for traffic and control channels. As an example, for control channels it is often sufficient to reach a certain minimum signal to noise ratio, whereas for traffic channels, the higher the signal to noise ratio, the better quality is achieved e.g. higher bit rates. Therefore, in such scenario, it is beneficial to use separate TPC commands as described above in according with embodiments of the present invention.

Figure 4:
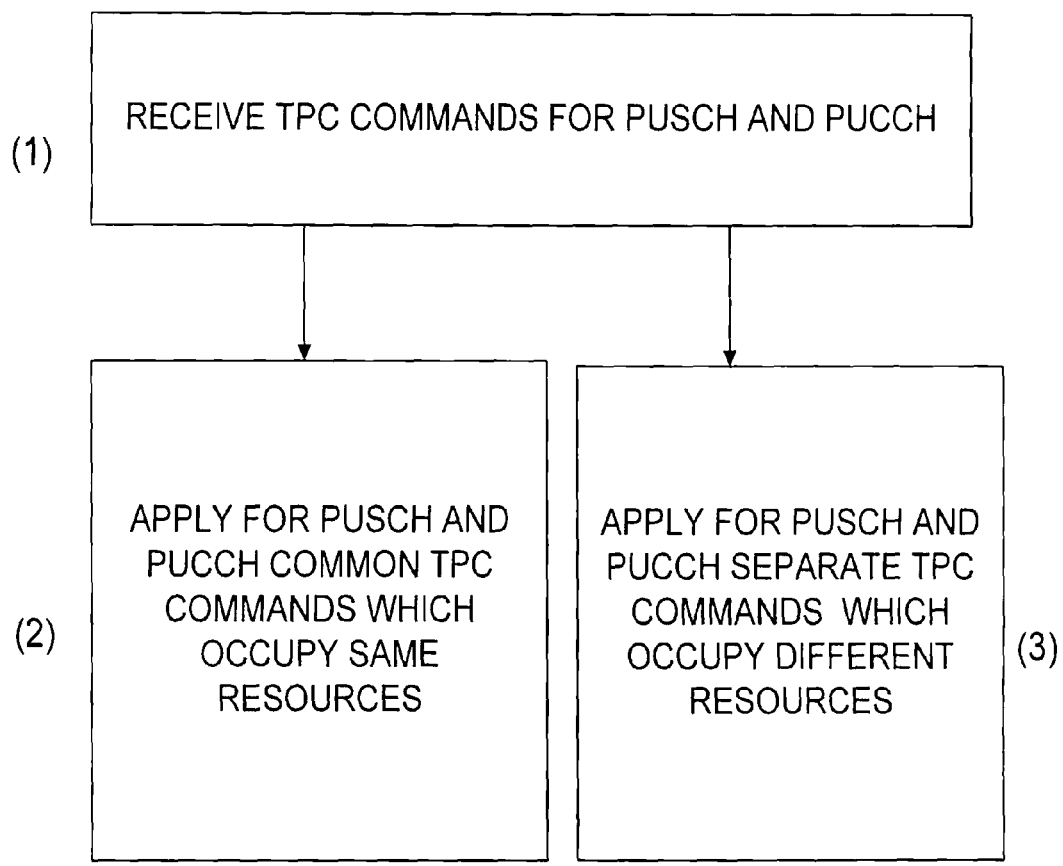
FIG. 4 illustrates a flowchart of a method according to exemplary embodiments of the present invention.

Referring to FIG. 4, there is illustrated a flowchart of a transmit power control method for use in a UE according to the previously described exemplary embodiments of the present invention. As shown in FIG. 4, the main steps of the method comprise:
(1) receiving TPC commands for the traffic (PUSCH) and control (PUCCH) channels respectively; the commands being separately identified by resources, as previously described;
(2) apply for the traffic and control channels, common TPC commands which occupy the same resources; and
(3) apply for the traffic and control channels, separate TPC commands which occupy different resources.

The present invention and its embodiments can be realised in many ways. For example, one embodiment of the present invention includes a computer-readable medium having instructions stored thereon that are executable by a user equipment of a telecommunications system. The instructions executable by the user equipment and stored on a computer-readable medium perform the transmit power control method steps of the present invention as set forth in the claims.

While the invention has been described in terms of several preferred embodiments, it is contemplated that alternatives, modifications, permutations and equivalents thereof will become apparent to those skilled in the art upon reading of the specifications and study of the drawings. It is therefore intended that the following appended claims include such alternatives, modifications, permutations and equivalents as fall within the scope of the present invention.

The invention claimed is:

1. A transmission power control method for use in a user equipment (UE) of a telecommunications system having a base station, wherein traffic and control channels of the system each occupy allocated physical or logical resources between the base station and the UE, the method comprising:
   receiving by the UE, transmit power control (TPC) commands for the traffic and control channels, respectively, wherein the TPC commands are separately identified by radio network temporary identifiers (RNTIs);
   applying by the UE for the traffic channel and the control channel, common TPC commands when the same RNTIs are used to identify the TPC commands for the traffic channel and the control channel; and
   applying by the UE for the traffic channel and the control channel, separate TPC commands when different RNTIs are used to identify the TPC commands for the traffic channel and the control channel.

2. The method according to claim 1, wherein the UE receives the TPC commands on a physical downlink control channel (PDCCH) sent from the base station to the UE.

3. The method according to claim 2, wherein the step of applying common power control commands to the traffic channel and the control channel includes applying by the UE, the common transmit power control commands to a physical uplink shared channel (PUSCH) corresponding to an uplink traffic channel and applying the common transmit power control commands to a physical uplink control channel (PUCCH) corresponding to an uplink control channel.

4. The method according to claim 2, wherein the step of applying separate power control commands to the traffic channel and the control channel includes applying by the UE, separate transmit power control commands to a physical uplink shared channel (PUSCH) corresponding to an uplink traffic channel and to a physical uplink control channel (PUCCH) corresponding to an uplink control channel.

5. A user equipment (UE) of a telecommunication system having a base station and multiple channels including traffic and control channels each occupying allocated physical or logical resources between the base station and the UE, the UE comprising:
   receiving means for receiving transmit power control (TPC) commands for a traffic channel and a control channel, respectively, the TPC commands being separately identified by radio network temporary identifiers (RNTIs);
   means for applying for the traffic channel and the control channel, common TPC commands when the same RNTIs are used to identify the TPC commands for the traffic channel and the control channel; and
   means for applying for the traffic channel and the control channel, separate TPC commands when different RNTIs are used to identify the TPC commands for the traffic channel and the control channel.

6. The UE according to claim 5, wherein the receiving means is configured to receive the TPC commands on a physical downlink control channel (PDCCH) received from the base station.

7. The UE according to claim 6, wherein the traffic channel is a physical uplink shared channel (PUSCH) and the control channel is a physical uplink control channel (PUCCH).

8. A transmission power control method for use in a base station of a telecommunications system, the system including a user equipment and multiple channels including traffic and control channels, each occupying allocated physical or logical resources between the base station and the user equipment, the method comprising:

> transmitting a message to the user equipment indicating a radio network temporary identifier (RNTI) identifying transmit power control (TPC) commands for a traffic channel, and indicating an RNTI identifying TPC commands for a control channel;
>
> transmitting for the traffic channel and the control channel, common TPC commands which occupy the same resources, when the same RNTI is used to identify the TPC commands for the traffic channel and the control channel; and
>
> transmitting for the traffic channel and the control channel, separate TPC commands which occupy different resources, when different RNTIs are used to identify the TPC commands for the traffic channel and the control channel.

9. The method according to claim 8, further comprising transmitting the TPC commands on a physical downlink control channel (PDCCH) sent from the base station to the user equipment.

10. The method according to claim 9, wherein the traffic channel is a physical uplink shared channel (PUSCH), and wherein the control channel is a physical uplink control channel (PUCCH).

11. A base station of a telecommunications system, said system including a user equipment and multiple channels including traffic and control channels, each occupying allocated physical or logical resources between the base station and the user equipment, wherein the base station is configured to:

> transmit a message to the user equipment indicating a radio network temporary identifier (RNTI) identifying transmit power control (TPC) commands for a traffic channel, and indicating an RNTI identifying TPC commands for a control channel;
>
> transmit for the traffic channel and the control channel, common TPC commands which occupy the same resources, when the same RNTI is used to identify the TPC commands for the traffic channel and the control channel; and
>
> transmit for the traffic channel and the control channel, separate TPC commands which occupy different resources, when different RNTIs are used to identify the TPC commands for the traffic channel and the control channel.

* * * * *

UNITED STATES PATENT AND TRADEMARK OFFICE
CERTIFICATE OF CORRECTION

PATENT NO.         : 8,594,012 B2                                Page 1 of 1
APPLICATION NO.    : 12/740260
DATED              : November 26, 2013
INVENTOR(S)        : Dahlman et al.

It is certified that error appears in the above-identified patent and that said Letters Patent is hereby corrected as shown below:

Title Page, in Item (75), under "Inventors", in Column 1, Line 2, delete "Furuskar," and insert -- Furuskär, --, therefor.

Title Page, in Item (56), under "OTHER PUBLICATIONS", in Column 2, Line 3, delete "Shenzen,China." and insert -- Shenzhen, China. --, therefor.

On Title Page 2, in Item (56), under "OTHER PUBLICATIONS", in Column 2, Line 5, delete "Wet Al:" and insert -- W et al., --, therefor.

In the Specification

In Column 4, Line 9, delete "a eNodeB" and insert -- an eNodeB --, therefor.

In Column 4, Line 15, delete "invention." and insert -- invention, --, therefor.

Signed and Sealed this
Fourteenth Day of April, 2015

Michelle K. Lee
*Director of the United States Patent and Trademark Office*